United States Patent
Duckworth et al.

(10) Patent No.: US 7,899,628 B2
(45) Date of Patent: Mar. 1, 2011

(54) SYSTEM, METHOD AND PROGRAM PRODUCT TO SCREEN FOR LONGITUDINAL-SEAM ANOMALIES

(75) Inventors: Noel Duckworth, Richmond, TX (US); Ron Sherstan, Cypress, TX (US)

(73) Assignee: Kinder Morgan, Inc., Houston, TX (US)

( * ) Notice: Subject to any disclaimer, the term of this patent is extended or adjusted under 35 U.S.C. 154(b) by 238 days.

(21) Appl. No.: 12/270,432

(22) Filed: Nov. 13, 2008

(65) Prior Publication Data

US 2009/0164143 A1 Jun. 25, 2009

Related U.S. Application Data

(60) Provisional application No. 61/008,822, filed on Dec. 21, 2007.

(51) Int. Cl.
*G01N 27/83* (2006.01)
(52) U.S. Cl. .................................................. 702/38
(58) Field of Classification Search .................... 702/38
See application file for complete search history.

(56) References Cited

U.S. PATENT DOCUMENTS

| | | | |
|---|---|---|---|
| 3,483,466 A | 12/1969 | Crouch et al. |
| 3,539,915 A | 11/1970 | Walters et al. |
| 3,753,085 A | 8/1973 | Morton et al. |
| 5,182,775 A | 1/1993 | Matsui et al. |
| 5,479,100 A | 12/1995 | Fowler et al. |
| 5,943,632 A | 8/1999 | Edens et al. |
| 6,373,245 B1 | 4/2002 | Kwun et al. |
| 6,597,997 B2 | 7/2003 | Tingley |
| 6,727,691 B2 | 4/2004 | Goldfine et al. |
| 6,995,557 B2 | 2/2006 | Goldfine et al. |

*Primary Examiner*—Tung S Lau
(74) *Attorney, Agent, or Firm*—Bracewell & Giuliani LLP

(57) ABSTRACT

Embodiments of the present invention provide systems, program product and methods to detect crack-like features in pipeline welds using magnetic flux leakage data and pattern recognition. A screening process, for example, does not affect or change how survey data is recorded in survey tools; only how it is analyzed after the survey data is completed. Embodiments of the present invention can be used to screen for very narrow axial anomalies in the pipeline welds, and may also be used to predict the length of such anomalies. Embodiments of the present invention also produce a listing of the anomalies based on their relative signal characteristics.

10 Claims, 18 Drawing Sheets
(7 of 18 Drawing Sheet(s) Filed in Color)

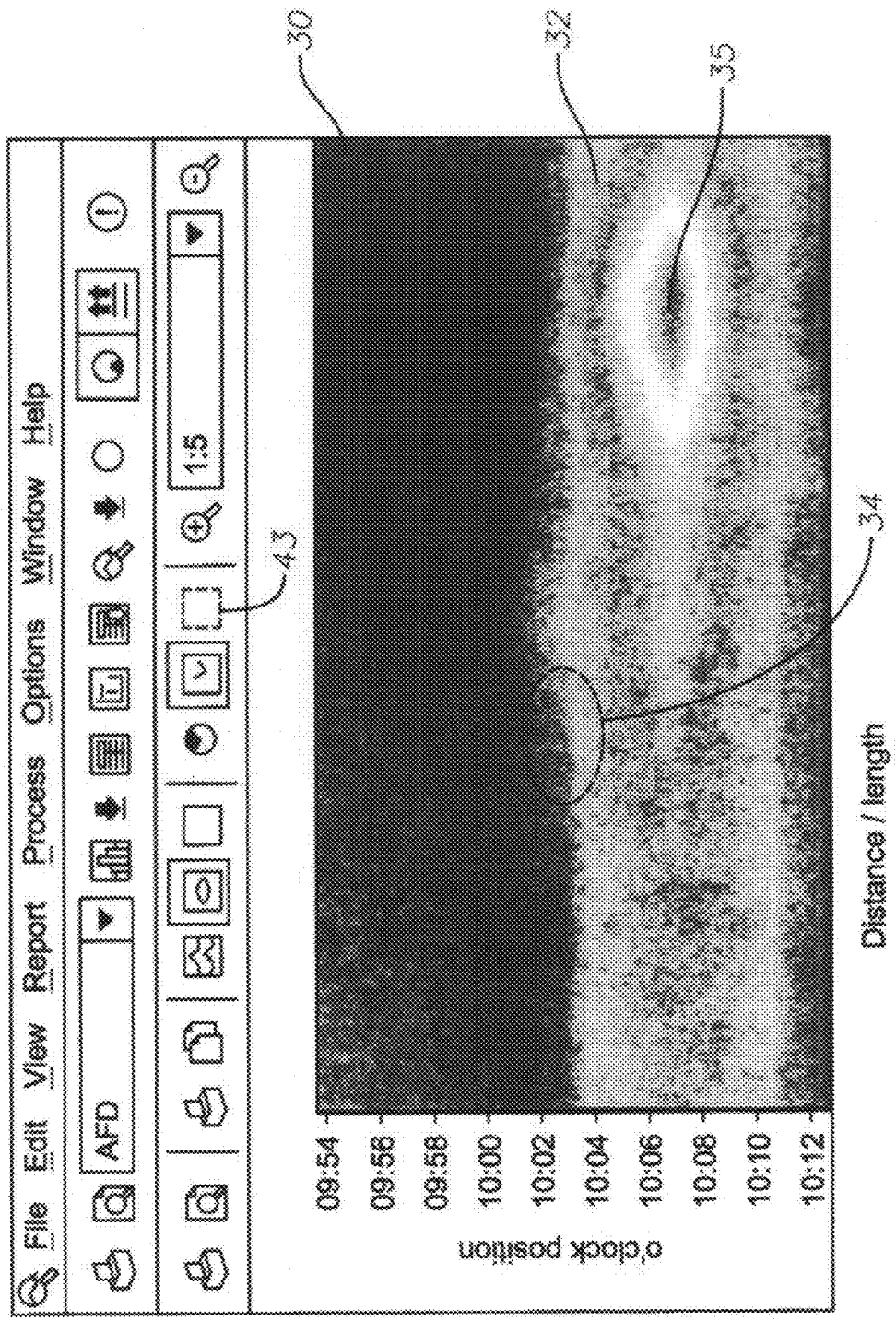

SYSTEM, METHOD AND PROGRAM PRODUCT TO SCREEN FOR LONGITUDINAL-SEAM ANOMALIES

CROSS-REFERENCE TO RELATED APPLICATIONS

This application claims priority to U.S. Provisional Application Ser. No. 61/008,822, filed Dec. 21, 2007 and is hereby incorporated by reference in its entirety.

BACKGROUND

1. Field of Invention

The present invention relates to the detection of cracks and incomplete fusions in pipeline welds and, more particularly, to a screening process which utilizes pattern recognition to identify the location of cracks and incomplete fusions along a welded pipeline using transverse magnetic flux technology.

2. Description of Related Art

Pipelines with welded longitudinal-seams have experienced in-service failures due to incomplete fusion and hook cracks. These issues are well known, well understood, and have been serious considerations of pipeline integrity management groups throughout the industry for a number of years. They have also been one of the focus elements of the regulatory agencies responsible for assuring that pipeline operators are assessing all threats to the integrity of their pipelines.

In normal analysis processes utilizing transverse flux technology, detection processes have been primarily focused on the identification and quantification of volumetric metal loss anomalies along a pipeline. These algorithms utilize the amount of flux leakage detected, the length of anomaly and width of anomaly (number of channels) to determine depth. When a "metal-loss" sizing algorithm is applied to narrow axial anomalies, the resulting predicted depth can be considerably shallower than the actual depth. Because there are a limited number of channels affected by the anomalies, the calculated depth is low and most often below a minimum reporting threshold. This results in a non-reported anomaly, which could lead to pipeline failures. As such, recognized by Applicants is the need for a new identification process that overcomes such limitations.

SUMMARY OF INVENTION

In view of the foregoing, embodiments of the present invention provide a new identification process developed through utilization of transverse flux inspection technology taken to a new level of sophistication with a disciplined methodical evaluation of anomaly signals. Particularly, embodiments of the present invention provide supplemental screening processes applied to pipeline survey data, which utilize a transverse magnetic flux leakage method and pattern recognition to identify potential longitudinal-seam anomalies in welded pipe, specifically focusing on the detection of incomplete fusion and hook cracks for example. The screening process of embodiments of the present invention does not affect or change how the survey data is recorded in the in-line inspection ("ILI") survey tools; only how it is analyzed after the survey data is completed. The flux leakage method is primarily influenced by anomaly air gap, which is a function of anomaly length and depth, steel properties, and hoop stress. Embodiments of the present invention, for example, can be used to screen for very narrow axial crack-like anomalies in the pipeline longitudinal welds, and may also be used to estimate the length of such anomalies. Embodiments of the present invention also produce a characterization and anomaly evaluation list based on their relative signal characteristics.

Embodiments of the present invention, for example, specifically identify electric resistance weld ("ERW") anomalies using a pattern recognition process. The application of this process can be sensitive to the pipeline steel properties, the capabilities of the specific ILI tool employed, and the pipeline operating conditions under which the survey was run. Thus, when applying embodiments of the present invention to other conditions, each variable can be considered for application specific adjustment if desired.

Embodiments of systems, program product, and methods of the present invention, as applied to this complex anomaly discrimination, preferably requires confirmation and validation of the process applicability in each case. The confirmation will minimally consist of several validation excavations utilizing "highest level" non-destructive evaluation ("NDE") methods and, in some cases, will require removal of appropriate samples for destructive metallurgical evaluation in a laboratory.

Embodiments of the present invention also are designed to identify certain potentially injurious anomalies such as hook cracks and incomplete fusion in, and immediately adjacent to, the longitudinal weld in pipeline. An embodiment of a method of process, for example, should begin by determining the critical flaw dimensions to be used to determine the maximum length of an anomaly in the magnetic flux leakage data that will be considered during the review of a linear anomaly using conventional critical flaw analysis equations. Examples of such equations include, but are not limited to, engineering based calculations such as Corlas and Keiffier. Prior to the review beginning, the data then should be reviewed to determine C-Scan (a 3-D color contour plot utilizing a few of the pipeline from a top plane view) and A-Scan (plot of trace signals from individual magnetic flux sensors) display settings for optimum identification of linear anomalies. The data then can be visually or electronically scanned, joint by joint, along the weld utilizing the C-Scan display to identify signal patterns generally consistent with longitudinal-seam anomalies. This, for example, can be defined as a level one (or Level 1) candidate screen.

Once the data pattern is deemed to be a level one (or Level 1) candidate anomaly, an embodiment of the method or process utilizes one or more saved C-Scan display settings as previously established and zooms (or enlarges a visual display) as necessary to analyze anomalies identified for pattern confirmation. This, for example, can be defined as a level two (or Level 2) candidate screen. If the pattern is deemed to be a level two candidate anomaly, an embodiment of a method or process then goes on to determine the approximate length of the anomaly and compare it to the maximum allowed for classification in this pipeline section, assuring that it does not exceed critical length. This, for example, can be defined as a level three (or Level 3) candidate screen. If the anomaly is determined to be below the critical flaw length, it qualifies as a level 3 candidate and can be documented in a table, chart, or summary spreadsheet, for example.

Note, the critical flaw length for each pipeline segment under review can be selected according to standard calculations considering actual pipeline operating conditions and pipeline material properties, to establish the maximum length of anomalies for consideration as potential axial crack-like defects located within the weld. That is, for a pipeline operating, for example, at pressures substantially less than standard, an equivalent critical length can be established using actual operating conditions. Beneficially, such selection aids in differentiating the crack-like defects from trim issues. Beneficially, such selection aids in differentiating the crack-like defects from trim issues.

If the pattern is deemed to be a level three candidate anomaly, an embodiment of a method goes on to analyze the anomaly using an A-Scan display, zoom as necessary and manipulate the gain to enhance the signal pattern. This, for example, can be defined as a level four (or Level 4) candidate screen. If the pattern is deemed to be a level four candidate anomaly, a table, chart, or summary spreadsheet, for example, of the results is generated for farther analysis and final confirmation. This, for example, can be defined as a level five (or level 5) candidate screen. Thereafter, embodiment of the present invention generates a validation dig list for a representative sample of all confirmed level five Candidates for excavation, extensive NDE analysis, and possible removal for laboratory analysis. In view of the foregoing, embodiments of the present invention provide a screening processes developed which utilize transverse magnetic flux technology to a new level of sophistication and detail.

BRIEF DESCRIPTION OF DRAWINGS

The patent or application file contains at least one drawing executed in color. Copies of this patent or patent application publication with color drawing(s) will be provided by the Office upon request and payment of the necessary fee. Some of the features and benefits of the present invention having been stated, others will become apparent as the description proceeds when taken in conjunction with the accompanying drawings, in which:

FIG. 2b is a perspective view of a C-Scan computer display showing the magnetic flux leakage data according to an embodiment of the present invention—the x-axis corresponds to length and the y-axis corresponds to o'clock position;

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

An embodiment of the present invention, for example, can include a supplemental screening process applied to survey data utilizing display software such as, for example, the Rosen Rosoft Display Software manufactured by the ROSEN Swiss AG of Stans, Switzerland (such as, for example, versions 6.60), to identify potential longitudinal-seam anomalies in welded pipelines, specifically focusing on the issues of incomplete fusion and hook cracks. Although the present disclosure describes the present invention in conjunction with the Rosoft Display Software only, other forms of display software can be utilized as well as understood by those skilled in the art.

Figure 1:
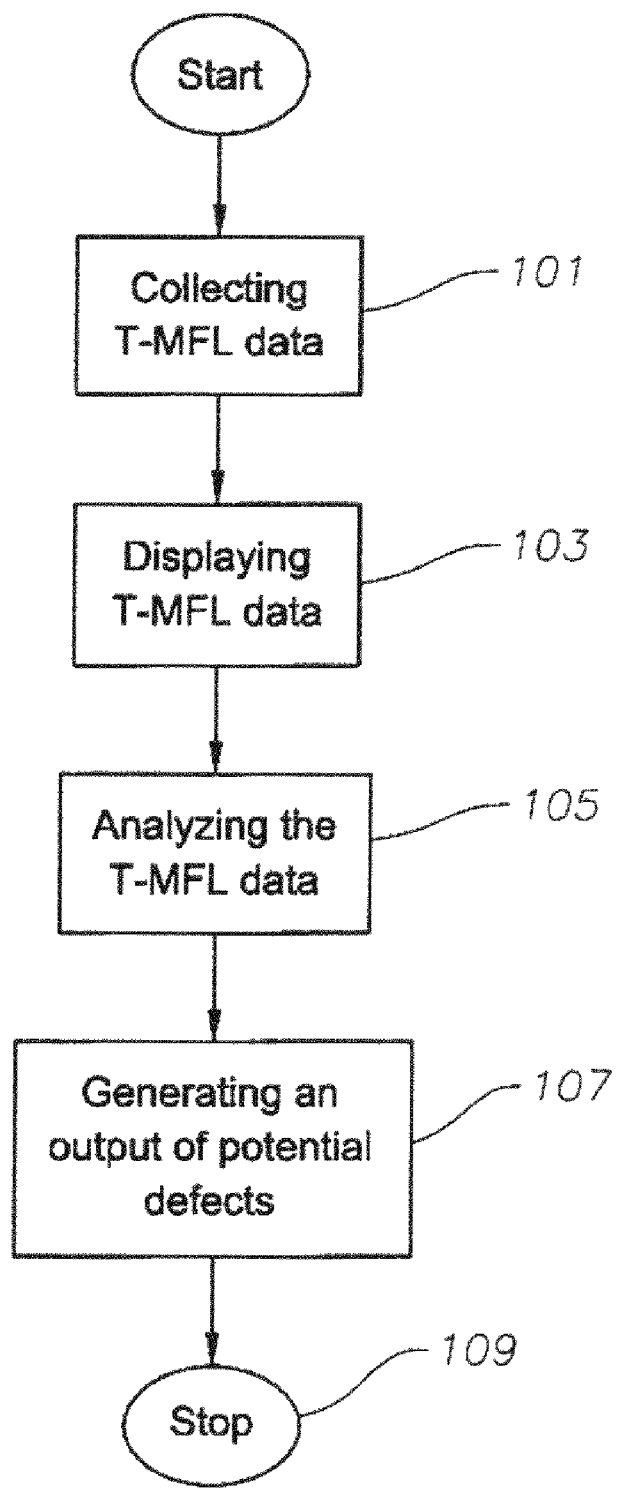
FIG. 1 is a flow chart illustrating a method for detecting longitudinal-seam anomalies according to an embodiment of the present invention.

An embodiment of a method of the present invention, such as shown in FIG. 1, can begin by collecting the transverse magnetic flux leakage data ("T-MFL") data from a survey tool (step 101), such as, for example, an ILI inspection tool. The T-MFL data is primarily influenced by anomaly air gaps, which are a function of anomaly length and depth, steel properties, and hoop stress. Once the T-MFL data has been collected from the survey tool at step 101, it is transmitted to a computer having a processor (not shown), as understood by those skilled in the art, for analysis. Such a transmission can be achieved via any number of wired or wireless communications techniques. At step 103, the processor then causes the T-MFL data to be displayed on a display as one or more patterns of data representing signal characteristics of the pipeline weld. As will be discussed later, these signal characteristics can be displayed as, for example, smooth waveforms, contrasting colors, erratic/non-erratic patterns, or symmetrical patterns.

At step 105, the processor will begin analyzing the T-MFL data based upon its respective signal characteristics and critical flaw dimensions, both of which are used to determine whether the data represents a potential crack-like defect in the pipeline weld. The critical flaw dimensions are a maximum length of an anomaly, which is represented by the T-MFL data being displayed on the display, to be considered as a potential crack-like defect in the weld.

The determination of the critical flaw dimensions will now be discussed. As stated above, embodiments of the present invention can focus on the characterization of signals that may prove to be injurious crack-like defects in a longitudinal weld. The transverse magnetic flux leakage ("T-MFL") inspection produces anomaly signatures from crack-like defects and from trim issues that can sometimes have very similar signal patterns. Critical flaw sizes for anomalies are determine for each pipeline segment under review using industry standard calculations considering actual pipeline operating conditions and pipeline steel material properties. Anomaly signals that have lengths substantially longer than the critical size are generally considered the result of non-injurious metal edges associated with trimming of the long seam. The industry standard calculations, for example, can establish the maximum length of anomalies for consideration as potential narrow axial crack-like defects located within a weld and can be used to filter out long anomalies that would have failed due to hoop stress, for example.

More specifically, or example, a conservative minimum detection limit for the transverse T-MFL tool is approximately 2" long and 60% wall thickness penetration. For example, as understood by those skilled in the art, anomalies with lengths greater than 150% of the calculated critical length (for a 60% through-wall flaw) may not be considered as potential defects since they would have failed previously under normal pipeline operating conditions at or near 72% of its specific minimum yield strength ("SMYS"). As understood by those skilled in the art, these percentages or lengths can be adjusted or varied by an operator/user or by a program controller to obtain any desired result. In the event that the pipeline is operating at pressures substantially less than 72% of SMYS, an equivalent critical length can be established as discussed above using actual operating conditions. The value supplied for length determination during the analysis screening process is 150% of the calculated critical length with no changes to the value being necessary. Other references to the "critical length" in this disclosure, by way of example, are the 150% value, Other values, however, may be used according to desired parameters.

Once the T-MFL data has been analyzed by the appropriate ILI vendor and a summary report/spreadsheet generated, a separate secondary analysis can be performed based on the signal characteristics and critical flaw dimensions to thereby develop a list of potential anomalies (step 107). Such an output can typically be a summary spreadsheet, associated screen captures and dig location sheets. Thereafter the process may end or be refined after having been excavated and evaluated as another step in the validation process (step 109).

Another embodiment of the present invention (see e.g. FIG. 2) embodies the present invention on a computer readable memory (or having hardware configured as such) executable by a computer, will instruct the processor (not shown) to collect the T-MFL data (step 201) such as discussed in relation to FIG. 1. The processor will then display the data on a display (step 203), such as, for example, an LCD computer screen. The analyst can utilize the various display options of the display software to manually determine the optimal display settings for the T-MFL data during analysis (step 205).

Figure 10:
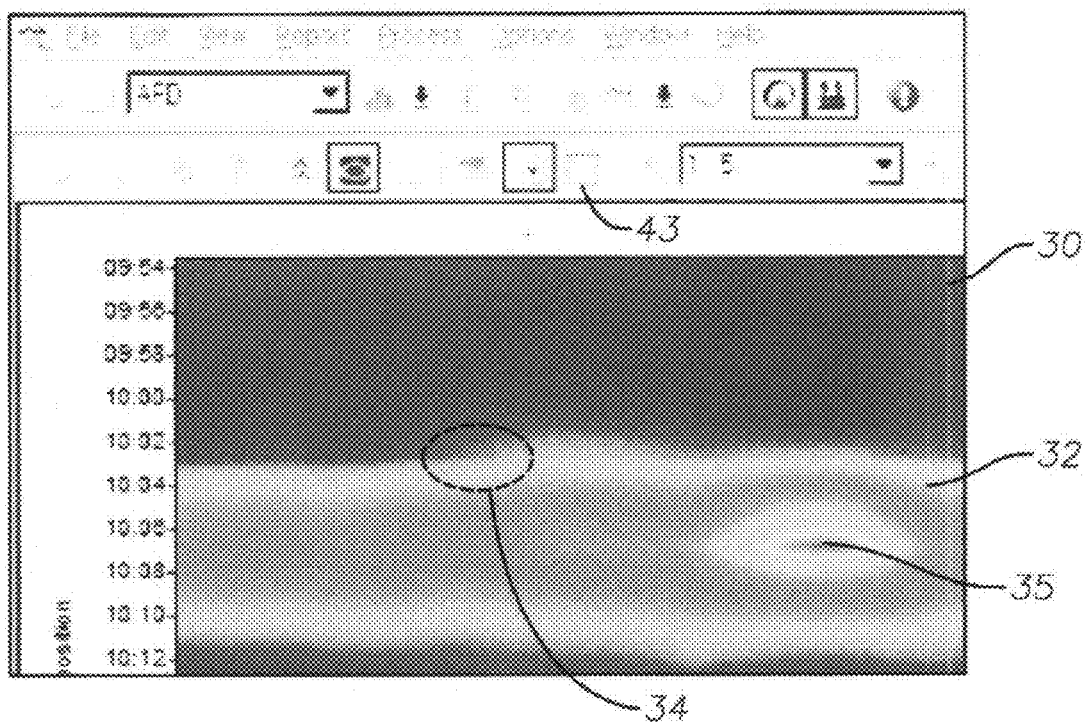
FIG. 10 is a colored illustration of the magnetic flux leakage data illustrated in FIG. 2b showing a strong contrast between T-MFL data and the surrounding background of the display and illustrating an anomaly signal having red and yellow contrasting colors with a "bloom" rising above and below the primary T-MFL signal according to an embodiment of the present invention.

When determining the optimal display parameters (step 205), the analyst selects various locations throughout the survey to determine one or more C-Scan and A-Scan display settings for optimum identification of linear ERW anomalies. One or more settings may be required for each wall thickness present in the pipeline. In doing so, the analyst can adjust the T-MFL display contrast and color intensity until there is a high contrast between the weld line within the T-MFL data 32 and the surrounding display background. For example, as illustrated in FIGS. 2b and 10, display 30 displays T-MFL data 32 having a strong contrast 34 between T-MFL data 32 and the surrounding background of the display. T-MFL data 32 also includes an anomaly signal 35 having red and yellow (color not shown) contrasting colors with a "bloom" rising above and below the primary T-MFL signal. As will be discussed later, the bloom is an extension of the anomaly signal 35 that extends into the adjacent channels.

Different pipelines, for example, may require unique software or program product display values due to differences in magnetic characteristics and due to diameter, wall thickness, grade, and tool speed during the actual inspection. The display software utilized as part of embodiments of the present invention, for example, can have an icon, button, know or other user interface on the display that, when clicked or operated, automatically sets the display values for optimum contrast. The processor then analyzes all the displayed data and responsively adjusts the values. This responsive setting, however, produces varying results depending on the amount of data displayed on the screen (i.e., how long a section of pipe and how much of the pipe circumference is displayed).

Figure 2A:
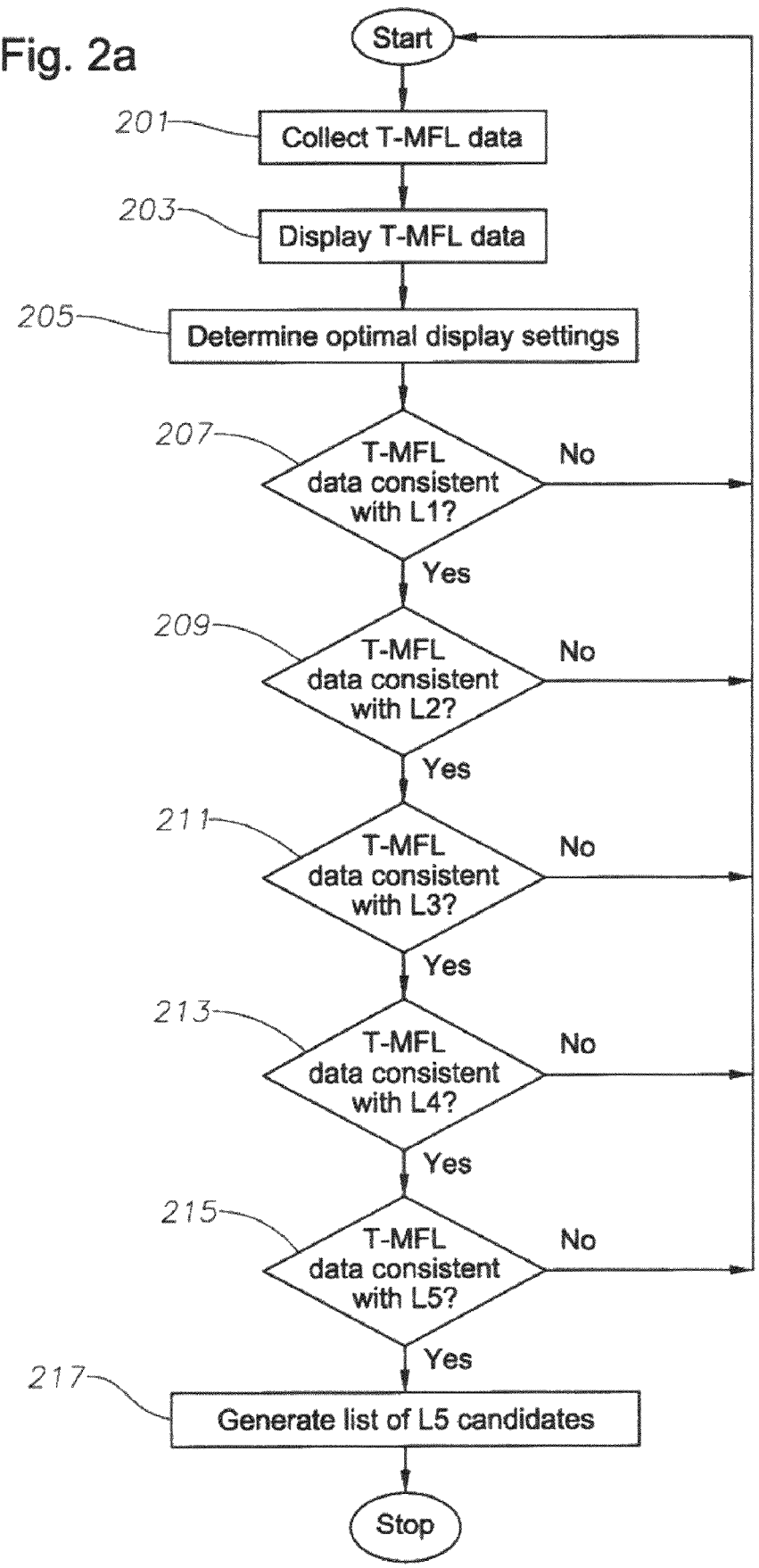
FIG. 2a is a flow chart illustrating a method for detecting longitudinal-seam anomalies according to an embodiment of the present invention.
Figure 2C:
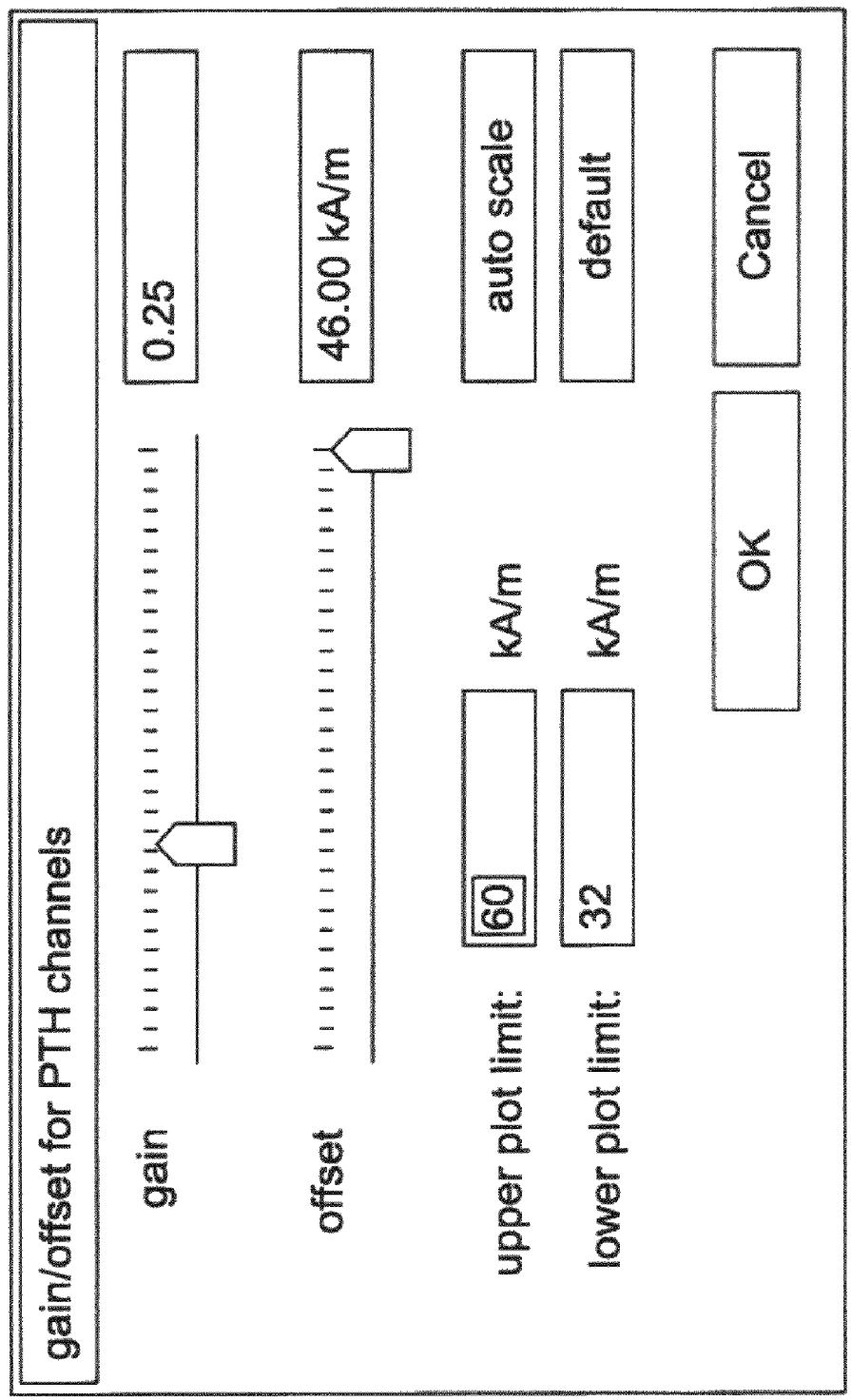
FIG. 2c-2f are perspective views of a display of a computer showing the optimal display settings used to detect longitudinal-seam anomalies according to an embodiment of the present invention.

As illustrated at step 205 of FIG. 2a, another display screen showing how the gain and offset of the T-MFL signal, can be manually sized to generate a high contrast display as part of the optimal display settings. The gain and offset values (or other variables depending on ILI vendor software) can be dependent on the specific response of the pipeline in question, and can vary substantially from one pipeline to the next. Once the presentation of the display has been optimized, the C-Scan/A-Scan values used for gain and offset (i.e., optimized setting values) can be saved, for example, with a unique file name, or otherwise recorded for future reference.

Figure 12:
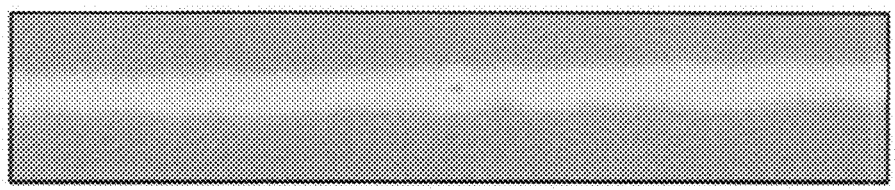
FIG. 12 is a colored illustration providing an example of incorrect display settings resulting in a poor, fuzzy display with no clear indication of a "bloom" extending radially above and below a potential anomaly according to an embodiment of the present invention.
Figure 13:
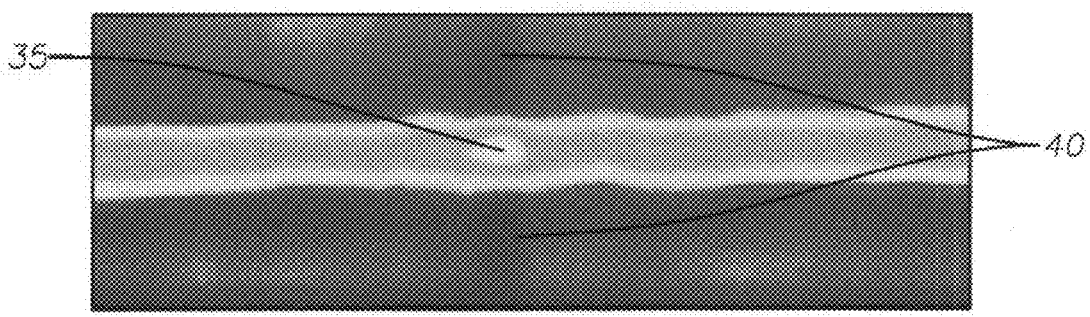
FIG. 13 is a colored illustration providing an example of optimum display settings resulting in a clear and distinct contrasting signal with a "bloom" of the signal extending radially above and below a clearly distinctive anomaly according to an embodiment of the present invention.

Note, FIG. 12 is a colored illustration providing an example of incorrect display settings resulting in a poor, fuzzy display with no clear indication of a bloom extending radially above and below a potential anomaly. FIG. 13 is a colored illustration providing an example of optimum display settings resulting in a clear and distinct contrasting signal with a bloom 40 extending radially above and below a clearly distinctive anomaly 35.

Figure 2D:
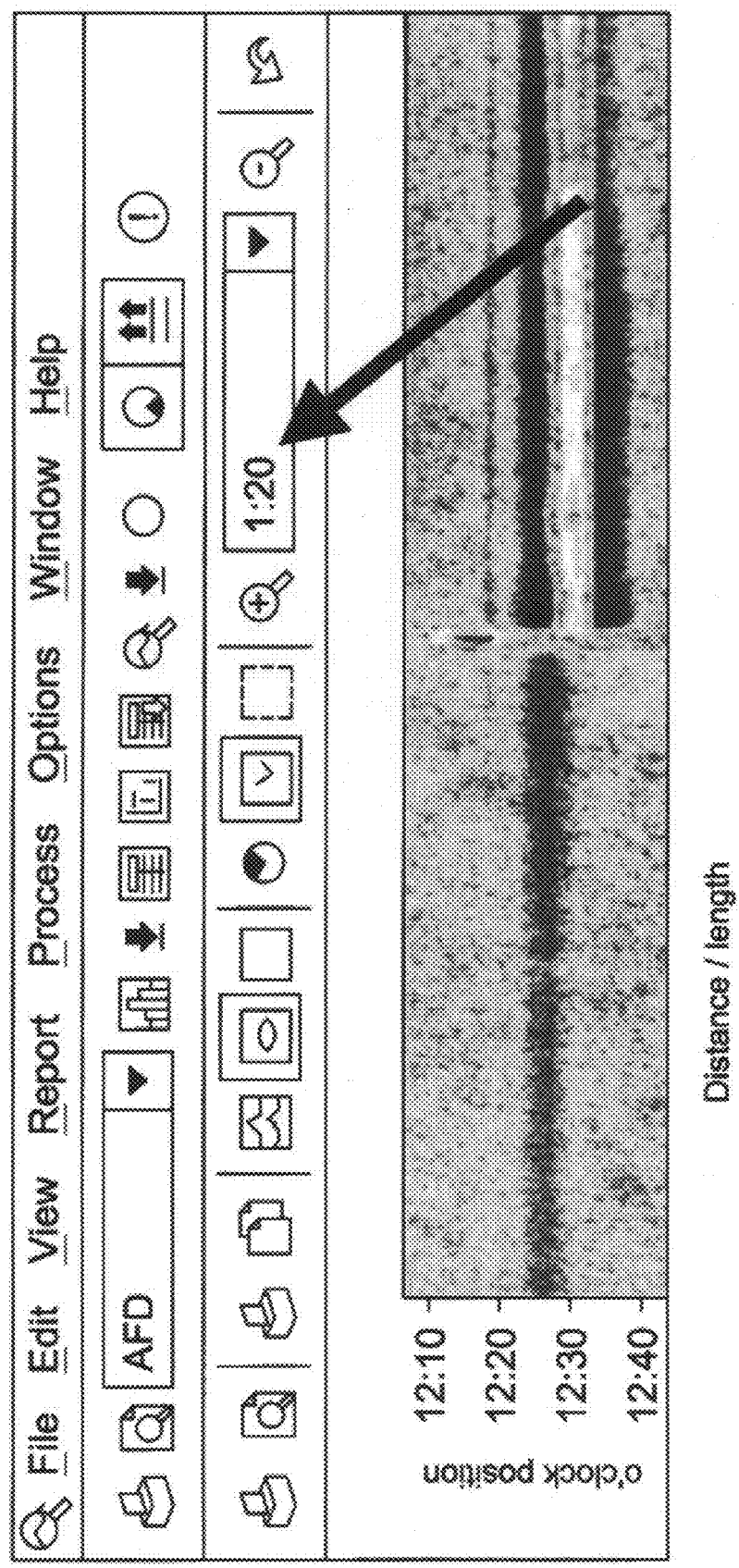
Figure 2E:
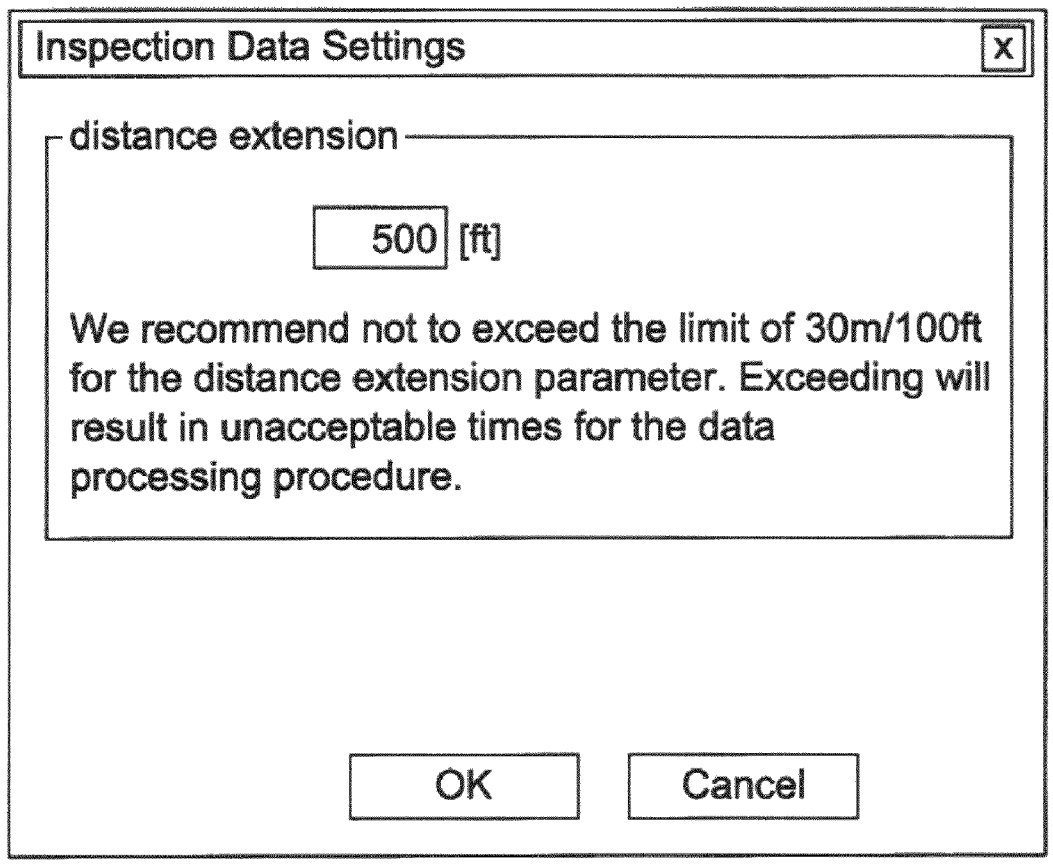
Figure 2F:
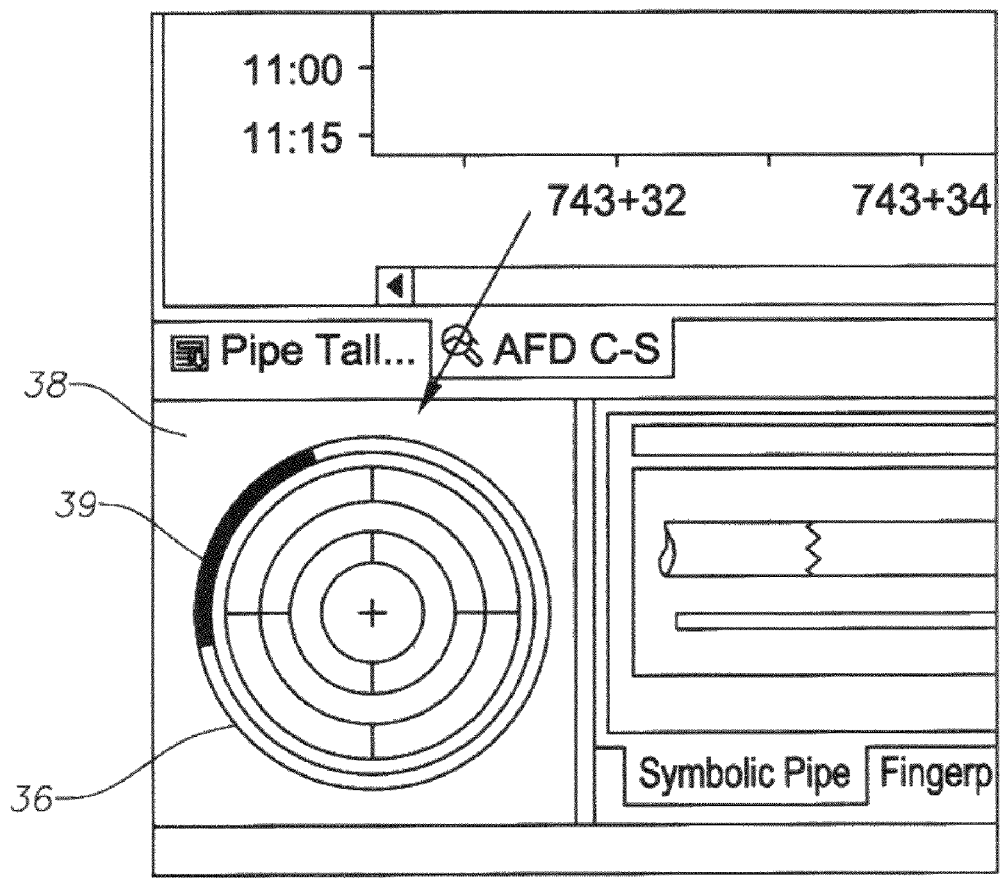
Figure 8:
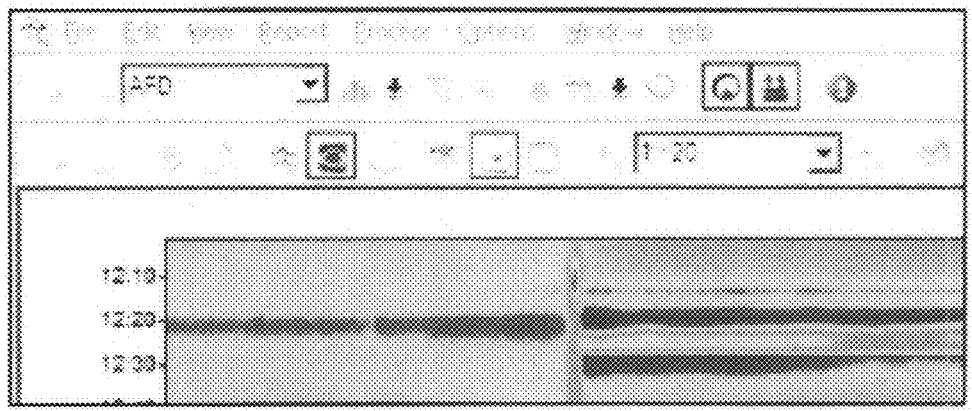
FIG. 8 is a colored illustration of the display of the computer illustrated in FIG. 2d showing a field for selecting a certain length of pipe along with a corresponding saved C-scan of the length of pipe according to an embodiment of the present invention.

Embodiments of the present invention also allow the length of pipeline data displayed (as T-MFL data 32) to be set. As illustrated in FIGS. 2d and 8, in a preferred configuration, the display 30, for example, can display 20 feet of pipeline data at a time. This display distance, however, can be adjusted to any desired length. For example, in FIG. 2e, the range has been adjusted to 500 feet. Bear in mind that this large value increases the time for the computer to load the T-MFL data, therefore memory and processor speed can determine the optimum number to select. The more data loaded at a time will increase the distance that can be reviewed before more data needs to be loaded.

In step 205 of FIG. 2a, for example, in addition to length of pipe displayed on display 30, the amount of pipe circumference displayed is important. The combination of length and percent of pipe circumference displayed, for example, sets the aspect ratio for the displayed anomalies. For reasonably fast scans and low probability of missing an important candidate anomaly, a preferred configuration displays no more than 90 degrees of the pipeline circumference on display 30. This means that one must stop at the end of each pipe joint to "center" the longitudinal seam in the next joint. This is best accomplished by "toggling on" the Angular display 38 of FIG. 2f, which illustrates an exemplary embodiment of a display screen showing pipeline circumference 36. Display 30, for example, may also include an icon which allows a user to "toggle" the display on and off. The quadrant section 39 displayed in the outer ring can be rotated along its o'clock position, for example, by left-clicking the highlighted area of the outer ring and dragging it around for centering of the weld.

In step 207 of FIG. 2a, once all display settings have been set up and finalized, program products of the present invention scan T-MFL data 32 using these values. During the scanning process, display software utilizes the saved C-Scan display settings (discussed above), and zooms as necessary, to review anomaly 35 as shown in FIGS. 2b and 10. Such scanning may be conducted manually or responsively to the display software.

Figure 9:
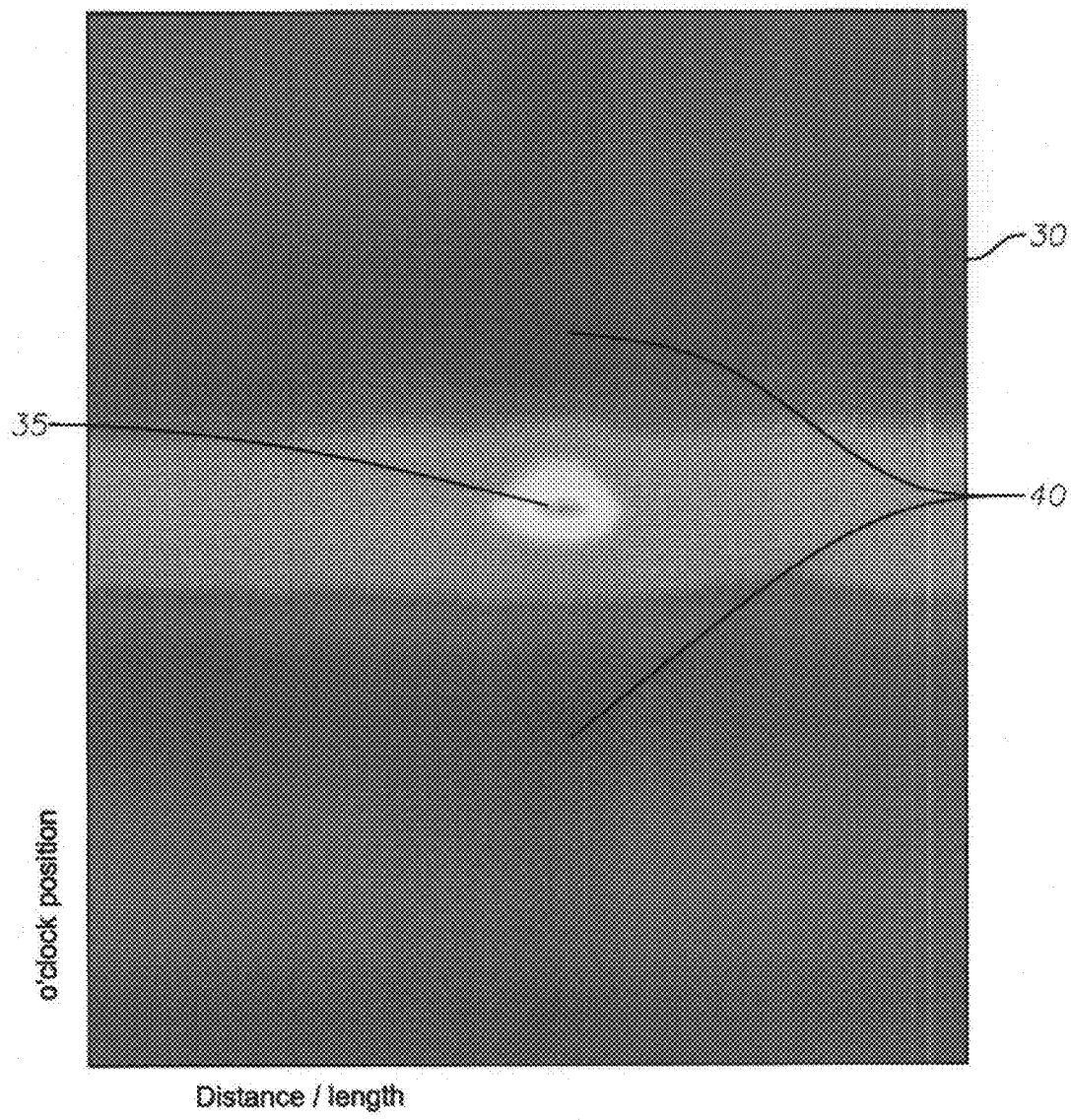
FIG. 9 is a colored illustration of the magnetic flux leakage data illustrated in FIG. 3 showing the color contrast of the T-MFL display used to detect a candidate anomaly according to an embodiment of the present invention.
Figure 17:
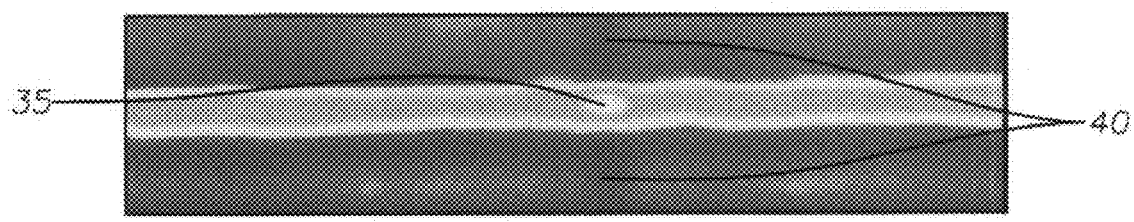
FIG. 17 is a colored illustration providing an example of an anomaly signal pattern highly indicative of a crack-like anomaly according to an embodiment of the present invention.

At step 207, for example, the C-Scan scrolling process is used to look for a, e.g., red anomaly pattern with a yellow transition ring centered and contained within the green weld of display 30. In a preferred configuration, the background of the display will be colored green to blue in order to further magnify the contrasting nature of the display. Please note, however, that any color pallet may be utilized according to embodiments of the present invention. These contrasting anomalies are considered to be level one candidates. FIG. 9 is a color illustration of such a display 30 having a level one candidate. FIG. 17 is a colored illustration providing an example of an anomaly signal pattern highly indicative of a crack-like anomaly.

Figure 18:
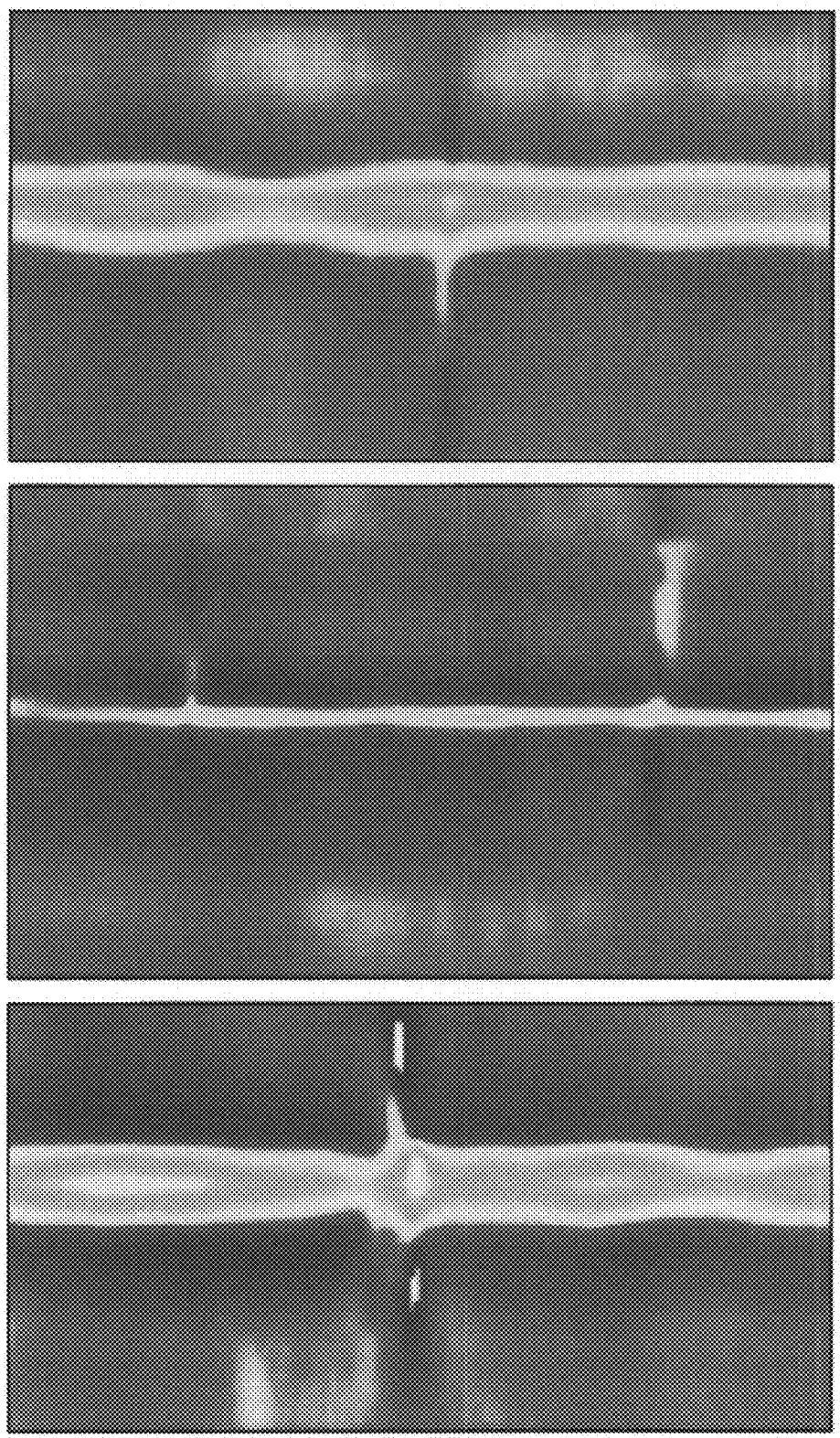
FIG. 18 is a colored illustration providing examples of anomaly signals for metal loss or other volumetric anomalies that extend across (transverse to) the seam of the longitudinal weld according to an embodiment of the present invention.

If the anomaly fails to meet the characteristics of this first anomaly level, the anomaly will be ignored and the process will continue collecting data at step 201 of FIG. 2a. FIG. 18 is a colored illustration providing examples of anomaly signals for metal loss or other volumetric anomalies that extend across (transverse to) the seam of the longitudinal weld, and thus, are candidates for exclusion from being considered a candidate level one anomaly.

Figure 3:
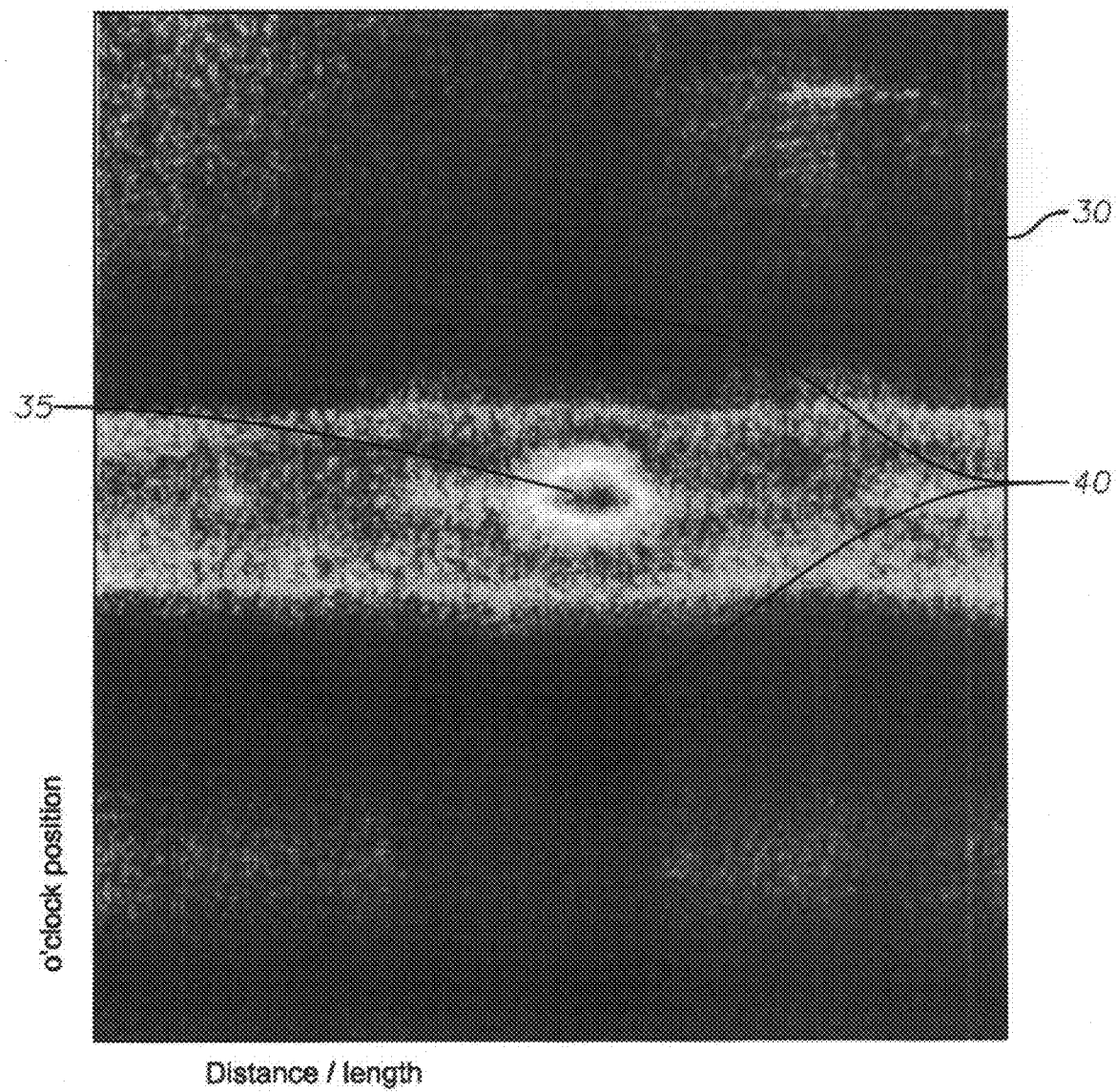
FIG. 3 is a perspective view of a C-Scan computer display of magnetic flux leakage data having blooms associated therewith according to an embodiment of the present invention—the x-axis corresponds to distance, while the y-axis corresponds to the o'clock position.
Figure 15:
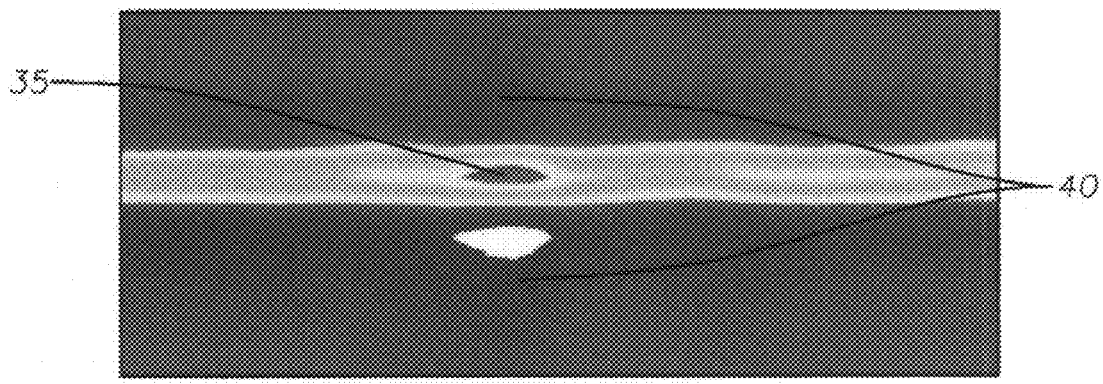
FIG. 15 is a colored illustration showing a high contrast anomaly signal of a crack-like anomaly in the presence of trend issues illustrated as yellow lines extending longitudinally on either side of the anomaly according to an embodiment of the present invention.
Figure 14:
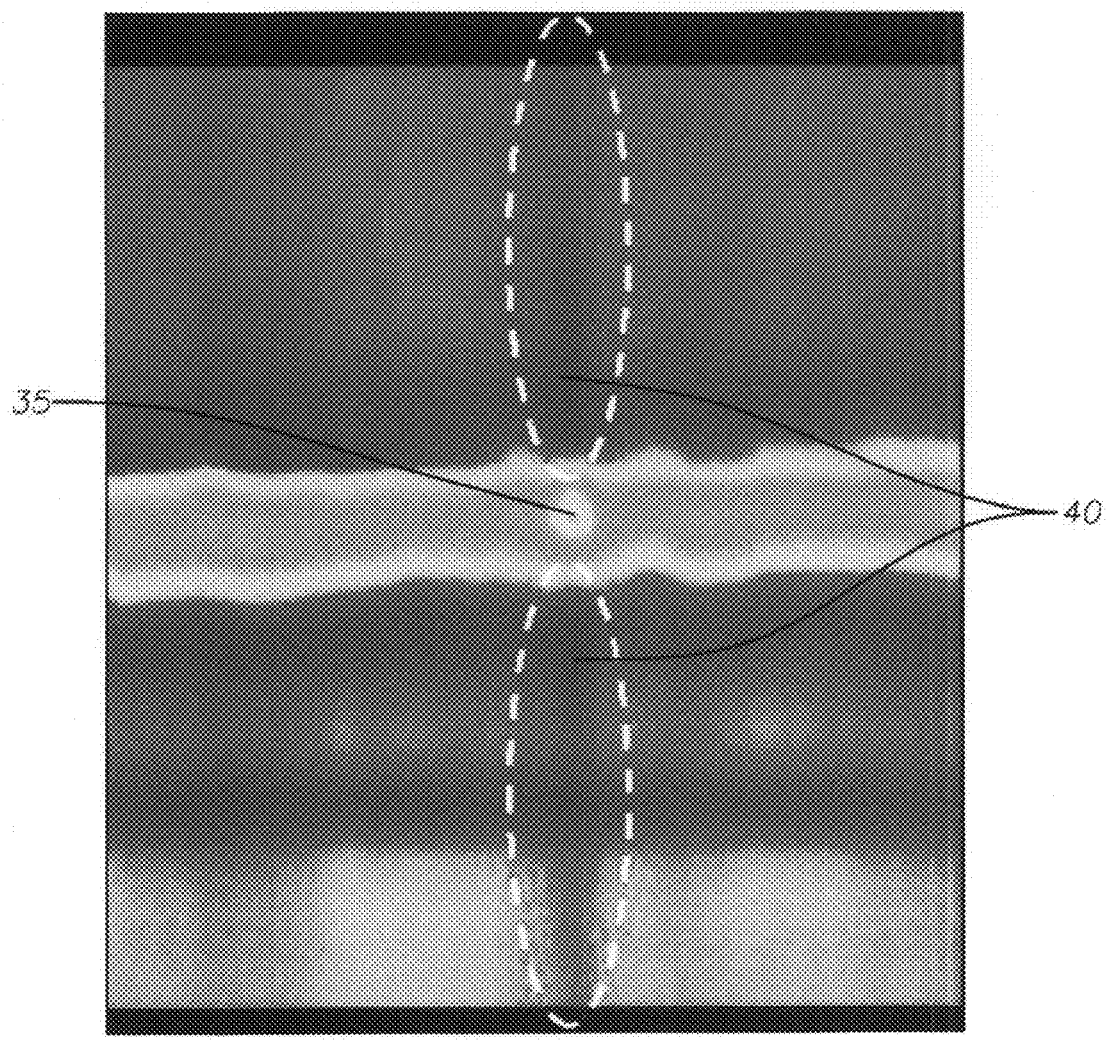
FIG. 14 is a colored illustration showing the extent of the "bloom" of an anomaly signal extending into adjacent channels according to an embodiment of the present invention.

As illustrated in FIGS. 3 and 9, however, those level one candidates that have an associated bloom 40 and a pattern that is somewhat symmetrical when cut through either the axial or transverse axis (or both), are considered to be level two candidates (step 209). FIG. 14 provides a colored illustration showing the extent of the bloom 40 of the anomaly 35 extending into adjacent channels. FIG. 15 is a colored illustration showing a high contrast anomaly signal of a crack-like anomaly 35 in the presence of trim issues illustrated as yellow lines extending longitudinally on either side of the anomaly 35.

Figure 16:
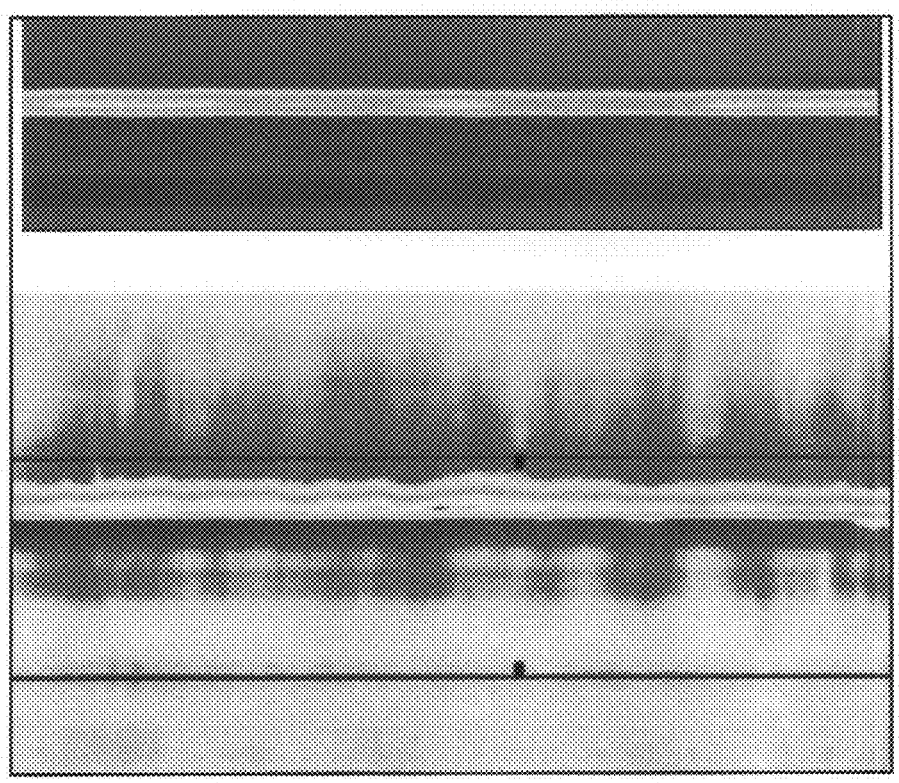
FIG. 16 is a colored illustration providing examples of an anomaly signal pattern characterized by the lack of an anomaly "bloom," excessive length, and lack of symmetry indicative of trim issues according to an embodiment of the present invention.

If the anomaly fails to meet the characteristics of this second anomaly level, the anomaly will be ignored and the process will continue collecting data (step 201 of FIG. 2a). FIG. 16 is a colored illustration providing examples of an anomaly signal pattern representing trim issues. Particularly, the illustration shows the lack of an anomaly bloom 40, excessive length, and lack of symmetry indicative of trim issues.

When a level two candidate is found, the scrolling process can be stopped and the anomaly evaluated in greater detail. The zoom function can be used as necessary to evaluate the anomaly signal characteristics. FIG. 10 provides a color illustration showing a strong contrast between T-MFL data 32 and the surrounding background of the display 30 and showing an anomaly signal 35 having red and yellow contrasting colors with a bloom 40 rising above and below the primary T-MFL signal.

Figure 4:
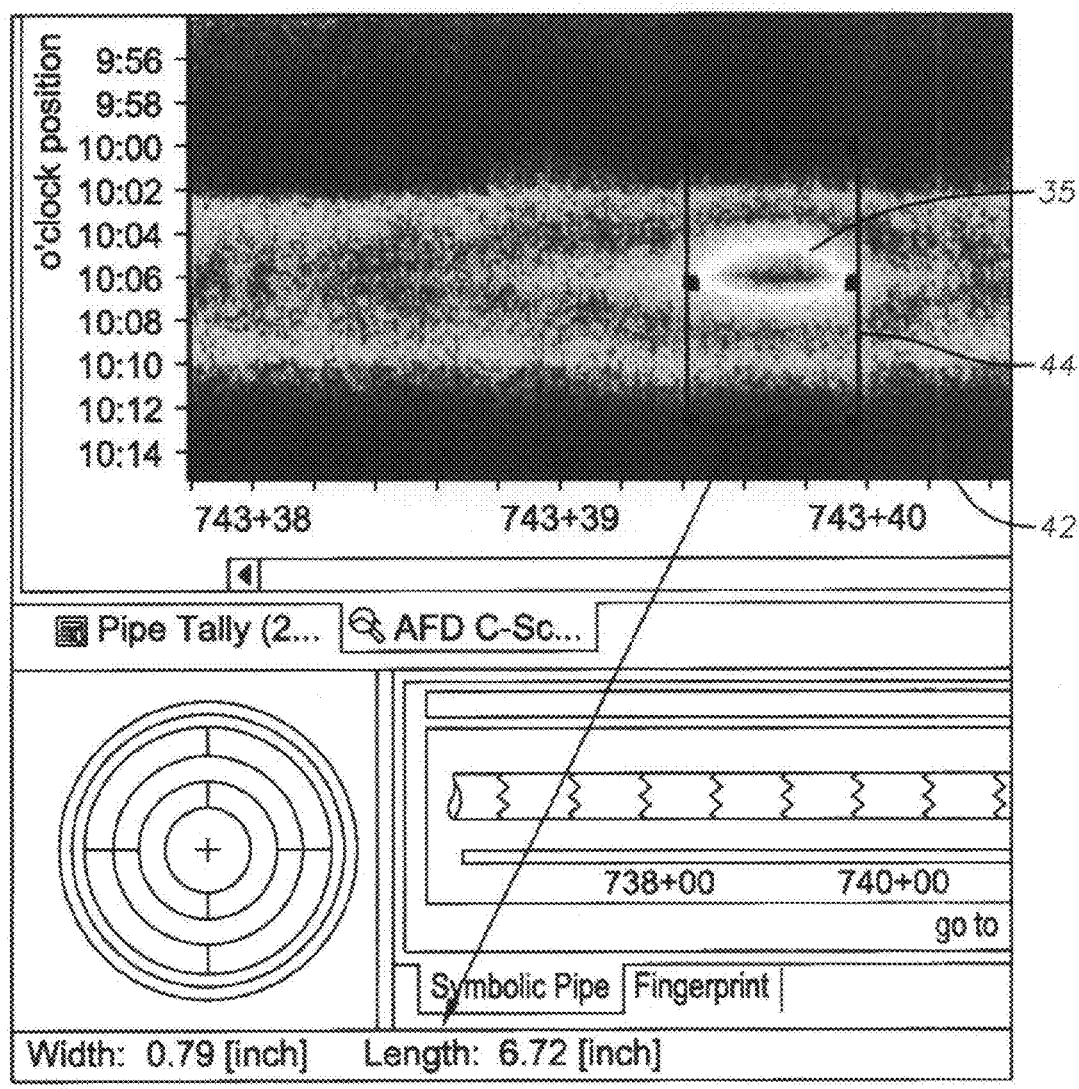
FIG. 4 is a perspective view of a C-Scan display showing how the length of the displayed magnetic flux leakage data is measured according to an embodiment of the present invention.
Figure 11:
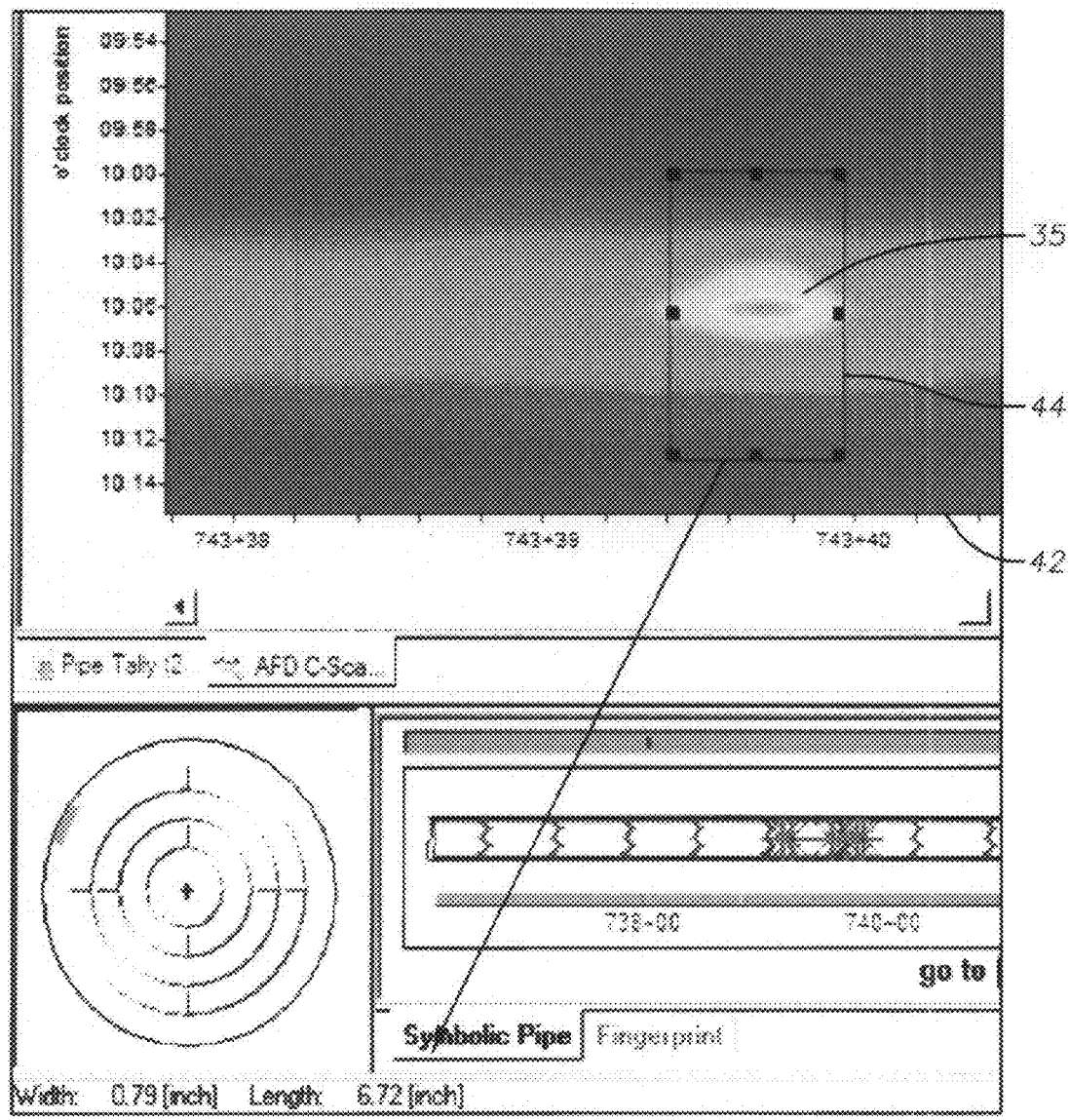
FIG. 11 is a colored illustration of the magnetic flux leakage data illustrated in FIG. 4 showing the color contrast of the T-MFL display used to size the displayed anomaly and size the displayed image according to an embodiment of the present invention.

After review of the level two candidate is complete, the level two candidate is analyzed to determine if it qualifies as a level three candidate anomaly (step 211). If the anomaly length is less than the critical flaw length discussed previously, the anomaly qualifies as a level three candidate. As illustrated in FIGS. 2b, 10, 4, and 11, in order to measure the length of anomaly 35, the Measuring Window 42 of a display can be toggled on, for example, via icon 43. Once the measuring window is turned on, for example, measurement of the length of anomaly 35 is simply a matter of setting up the display to enlarge the anomaly to reduce error and then dragging box 44 to anomaly 35. A good anomaly display for most situations, for example, is a 1:5 display and only showing approximately one hour of the pipeline circumference. The sides of box 44 can be adjusted by dragging them to the extremities of anomaly 35 and the length can be read near the lower left hand corner as shown in FIG. 4. If the anomaly fails to meet the characteristics of this third anomaly level, the anomaly will be ignored and the process will continue collecting data (step 201 of FIG. 2a). FIG. 11 is a colored illustration showing utilization of the box 44 to measure the size of the anomaly 35, enlargement of the image of the anomaly 35 to reduce error in the measurement, identification of extremities of the anomaly 35 utilizing the color contrast between the red anomaly pattern and yellow transition ring, and accurate positioning of the box 44 for automated measurement of the length of the anomaly 35. FIG. 11 also illustrates accurate sizing of the circumference of the longitudinal weld (e.g., selecting one hour of the circumference) through identification of the contrast between the green weld and the light blue background.

Figure 5:
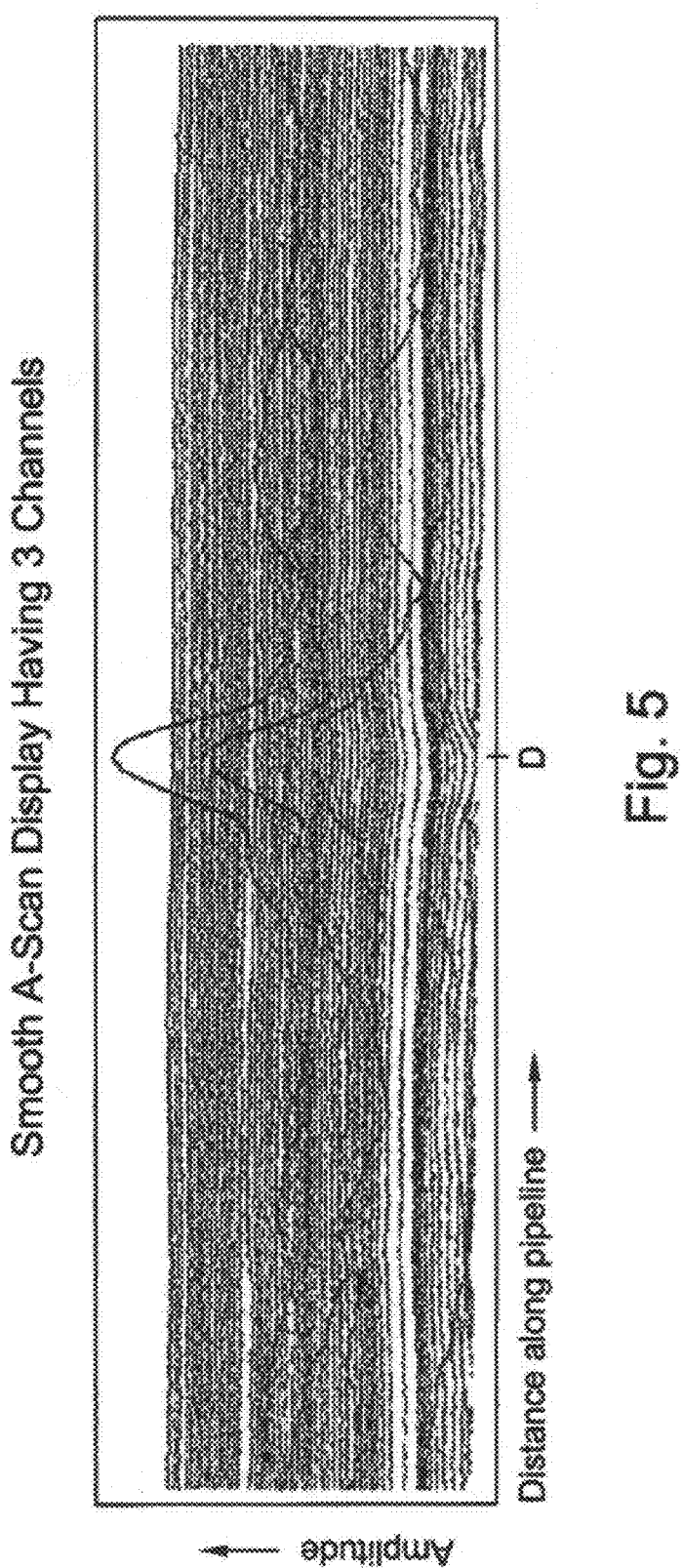
FIG. 5 is a graphical view of an A-Scan smooth waveform having three anomaly channels corresponding to a level four candidate anomaly according to an embodiment of the present invention—the x-axis corresponds to distance while the y-axis corresponds to amplitude.
Figure 6:
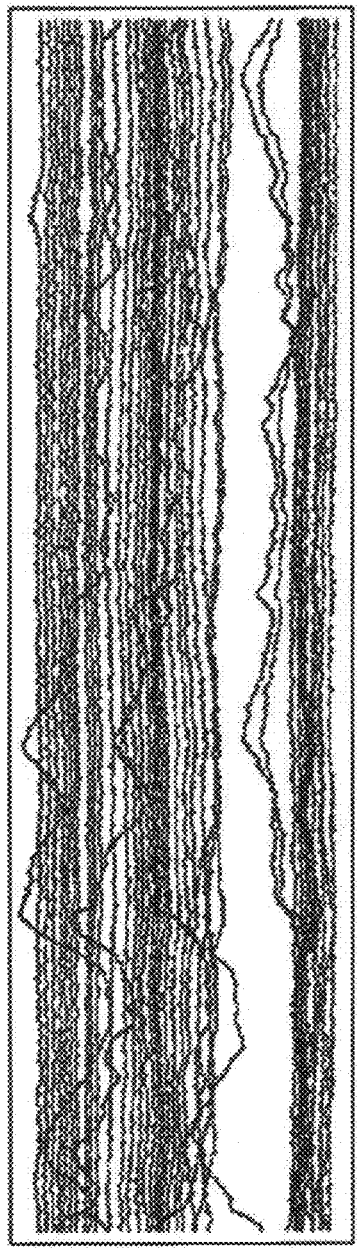
FIGS. 6 and 7 are graphical views of a ragged and uneven A-Scan waveform indicative of trim issues according to an embodiment of the present invention—the x-axis corresponds to distance while the y-axis corresponds to amplitude.
Figure 7:
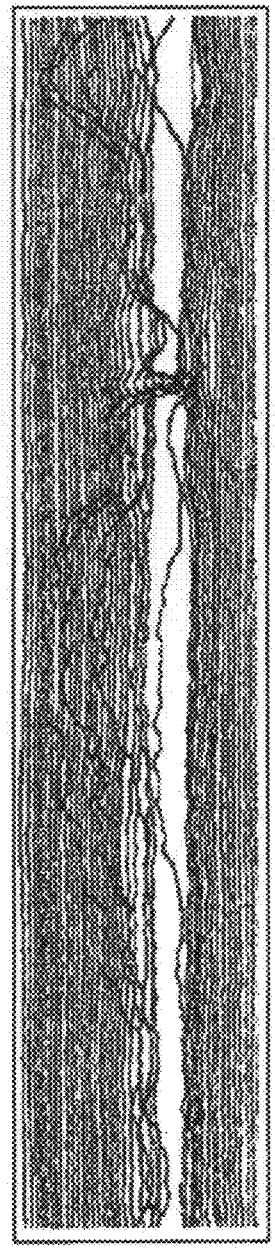

If, however, the anomaly does meet the characteristics of the third anomaly level, the anomaly will be further analyzed (step 213) to determine if the anomaly is consistent with a level four candidate anomaly. To determine if the pattern is a level four candidate, the anomaly is reviewed using the A-Scan display, zooming as necessary and manipulating the gain to increase the amplitude of the signal. FIG. 5 illustrates an example of an A-Scan signal pattern having three anomaly channels. The fourth anomaly level identifiers are a smooth waveform that stands out from surrounding background signals, an anomaly signal that is not associated with a long area of ragged erratic signals (which is typically indicative of trim issues as shown in FIGS. 6 and 7) and a maximum number of 4 anomaly channels, but typically 2 to 3 channels. Also, another key identifier of a level four anomaly is that when the gain of the anomaly is increased the anomaly will stand out from other signals, defined as the "rise" of the signal.

FIG. 5 also illustrates an exemplary A-scan signal showing the smooth waveform having only three affected channels. Each line in FIG. 5 represents an T-MFL signal received from a sensor surrounding the circumference of the pipeline. The y-axis represents the signal amplitude, while the x-axis represents the distance along the pipeline. As such, FIG. 5 illustrates three anomaly channels at a specified distance "D." The same axis definitions apply to FIGS. 6 and 7.

If the anomaly meets the above criteria, for example, it becomes a level four candidate. The appropriate information is entered into a summary spreadsheet for further review and final confirmation. The information is included in a table, chart, or spreadsheet, such as, for example, an Excel Spreadsheet that lists: (1) joint number containing the anomaly (U/S girth weld number); (2) absolute distance to U/S girth weld; (3) absolute surrey distance to the anomaly; (4) o'clock position of the weld; and (5) classification categories to be one of the following: (a) "A"—anomaly signal exhibits all of the subject characteristics, (b) "B"—anomaly signal exhibits some of the subject characteristics, but there is a question about its validity as an anomaly, (c) "C"—anomaly signal exhibits only a few of the subject characteristics but there are indications that it potentially could be all anomaly for consideration for other stated reasons or (d) "D"—anomalies that were excluded from the process. The reasons for the exclusion can be noted in a documentation spreadsheet; for example longer than determined critical length. The summary spread sheet may also include the length of the potential anomaly, any descriptions or comments and reasons why anomalies were included/excluded from anomaly conclusion. Once the anomaly is included or excluded the display is returned to the C-Scan view and the scrolling continued.

It is important to remain informed of anomalies that fall into "B" or "C" categories so the process can be refined to only include "A" anomaly signals and a limited number of the other categories in the final report. Moreover, for each "A", "B", or "C" anomaly reported, the analyst may provide screen captures as follows, having all screen captures in JPEG image format, for example, (hard copy in a book plus electronic copy on DVD):

1. Full Screen of C-Scan in optimum display mode with display set to 20 feet, 3 hours, and with centered. Include a girth weld if possible.
2. Full Screen of C-Scan in optimum display mode with display set to 5 feet, 1 hour, and with centered. Measurement Display is on and properly positioned to show measured length legibly.
3. Full Screen of A-Scan in optimum display mode with display set to 20 feet, 3 hours, and with centered. Gain should be increased until "noise" comes up equally with "signal" as gain is increased. Include a girth weld if possible.
4. Full Screen of A-Scan in optimum display mode with display set to 5 feet, as little circumference as possible, and with centered. Gain should be increased until "noise" comes up equally with "signal" as gain is increased.

Once the "A", "B", or "C" anomalies have been reviewed and confirmed, a complete dig sheet package can be generated utilizing embodiments of program product, e.g., software, if required to validate the callouts and develop an excavation/repair program. This listing can include a listing of each anomaly based upon the presence of the signal characteristics corresponding to Level four anomalies (i.e., "A", "B", "C" or "D" level anomalies).

Upon confirmation (step 215), embodiments of program product can create a list of all level five candidates (step 217). In other words, after Levels one thru four have excluded the non-qualifying anomalies, those remaining are considered Level five anomalies. All level five candidates can be investigated further by exposing the pipe and performing a complete NDE examination. As such, from time to time it may become necessary to remove certain defects from the pipeline for additional and sometimes destructive metallurgical testing.

The present invention has numerous advantages. The T-MFL screening process of the present invention can locate anomalies, such as cracks, in pipelines that otherwise go undetected by existing methods. If left undetected, these cracks would typically fail in "rupture mode," thereby leading to large volumes of contamination in the surrounding area and is hereby incorporated by reference in its entirety.

It is to be understood by those skilled in the art that the invention is not limited to the exact details of construction, operation, exact materials, or embodiments shown and described, as modifications and equivalents will be apparent to one skilled in the art. For example, although discussed as steps in a computerized process, steps of the present invention may also be accomplished manually. In addition, although aspects of the present invention have been described with respect to a computer, a computer device, a computer system, or processor executing program product or software that directs the functions of embodiments of the present invention, it should be understood by those skilled in the art that the present invention can be implemented as a program product for use with various types of data processing systems as well. Programs defining the functions of embodiments of the present invention, for example, can be delivered to a data processing system via a variety of signal-bearing media, which include, without limitation, non-rewritable storage media (e.g., CD-ROM, DVD-ROM), rewritable storage media (e.g., floppy disks, hard drive disks, CD-R, or rewritable ROM media), and communication media, such as digital and analog networks. It should be understood, therefore, that such signal-bearing media, when carrying or embodying computer readable instructions that direct the functions of embodiments of the present invention, represent alternative embodiments of the present invention. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

That claimed is:

1. A method for detecting longitudinal-seam anomalies in a low frequency pipeline weld of a pipeline, the method comprising:
    (a) receiving magnetic flux leakage data by a computer, the magnetic flux leakage data related to one or more anomaly air gaps within a longitudinal pipeline weld;
    (b) displaying the magnetic flux leakage data on a display as one or more selected patterns of data representing selected signal characteristics of the pipeline weld; and
    (c) analyzing the magnetic flux leakage data responsive to the selected signal characteristic and selected critical flaw dimensions of the pipeline weld, the selected signal characteristics being indicators of potential longitudinal-seam anomalies in the pipeline weld and the selected critical flaw dimensions being indicators of at least a maximum length of the potential longitudinal-seam anomalies along a pattern of magnetic flux leakage data, the analyzing including:

(1) determining optimal display settings on the display, the optimal display settings being responsive to different magnetic flux leakage characteristics;

(2) determining whether the magnetic flux leakage data is consistent with a first predetermined anomaly level responsive to the optimal display settings to thereby define a level one anomaly candidate, the first predetermined anomaly level having first selected signal characteristics consistent with the presence of longitudinal-seam anomalies;

(3) if the magnetic flux leakage data is consistent with the level one anomaly candidate, then determining if the level one anomaly candidate is consistent with a second predetermined anomaly level responsive to the optimal display settings, the second predetermined anomaly level defining a level two anomaly candidate having second selected signal characteristics different than the first selected signal characteristics and still consistent with the presence of longitudinal-seam anomalies;

(4) if the level one anomaly candidate is consistent with the level two anomaly candidate, then determining if the level two anomaly candidate is consistent with a third predetermined anomaly level responsive to the optimal display settings, the third predetermined anomaly level defining a level three anomaly candidate having third selected signal characteristics different than the first and second selected signal characteristics and yet still consistent with the presence of longitudinal-seam anomalies, the third selected signal characteristics also being indicative of the presence of the selected critical flaw dimensions of a pipeline weld;

(5) if the level two anomaly candidate is consistent with the third level anomaly candidate, then determining if the level three anomaly candidate is consistent with a fourth predetermined anomaly level responsive to the optimal display settings, the fourth predetermined anomaly level defining a level four anomaly candidate having fourth selected signal characteristics different than the first, second, and third selected signal characteristics and yet still consistent with the presence of longitudinal-seam anomalies; and (6) if the level three anomaly candidate is consistent with the level four anomaly candidate, then generating an output of the level four anomaly candidate to further determine if the level four anomaly candidate is consistent with a fifth predetermined anomaly level, the fifth predetermined anomaly level defining a level five anomaly candidate having fifth selected signal characteristics different from the first, second, third and fourth selected signal characteristics and yet still being indicative of one or more longitudinal-seam anomalies in the pipeline weld potentially leading to fluid leakage within the pipeline when the pipeline contains fluid therein.

2. A method as defined in claim 1, wherein the level one anomaly candidate comprises a pattern of data representing the level one anomaly candidate having contrasting colors associated therewith.

3. A method as defined in claim 1, wherein the level two anomaly candidate comprises a pattern of data representing the level two anomaly candidate having a symmetrical pattern and one or more associated blooms.

4. A method as defined in claim 1, wherein the level three anomaly candidate comprises a pattern of data representing the level three anomaly candidate having an anomaly length, along an axis of the pattern of data, less than a maximum length defined within the selected critical flaw dimensions.

5. A method as defined in claim 1, wherein the level four anomaly candidate comprises a pattern of data having one or more of the selected signal characteristics when displayed on the display, the selected signal characteristics comprising the following:
(1) a smooth waveform;
(2) less than four anomaly channels;
(3) a non-erratic pattern; or
(4) being distinguished from other signals on the display when a gain of the pattern of data is increased.

6. A method as defined in claim 1, wherein determining the optimal display settings on the display comprises changing a gain and offset of the pattern of data in order to achieve a high contrast display so that the presence of the one or more longitudinal-seam anomalies may be perceived on the display.

7. A method as defined in claim 1, wherein the pipeline is comprised of steel and the one or more anomaly air gaps are a function of anomaly length and depth, steel properties and hoop stress.

8. A method as defined in claim 1, further comprising the step of generating a validation dig list containing one or more level five candidate anomalies, whereby the list is used to identify areas along the pipeline which are to visually inspected for defects.

9. A method as defined in claim 5, wherein the output of the level four anomaly candidate comprises a listing of each level four anomaly candidate responsive to the presence of the fourth selected signal characteristics within the pattern of data representing the level four anomaly candidate.

10. A method as defined in claim 6, wherein determining the optimal display settings on the display further comprises:
changing a length of data being displayed on a display screen; and
changing an amount of data representing a pipeline circumference being displayed on the display screen, the amount of data representing no more than ninety degrees of the pipeline circumference.

* * * * *